Sept. 16, 1930.  R. WATERS ET AL  1,775,982
FILTER
Filed Oct. 31, 1929  2 Sheets-Sheet 1
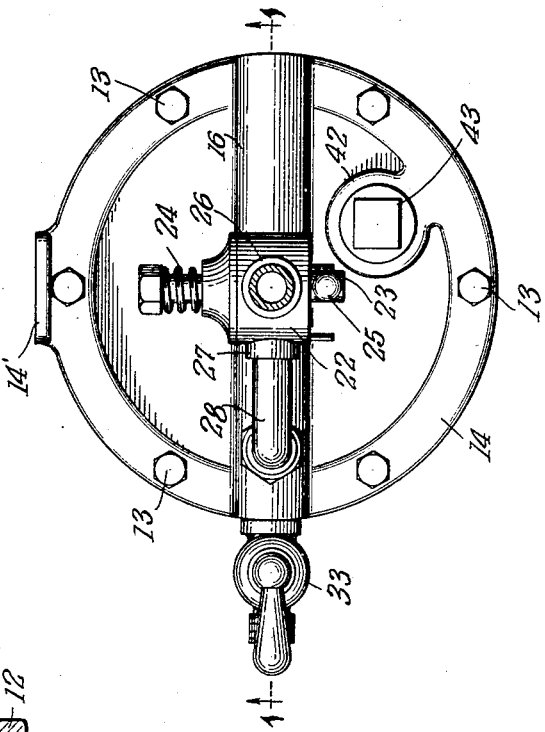
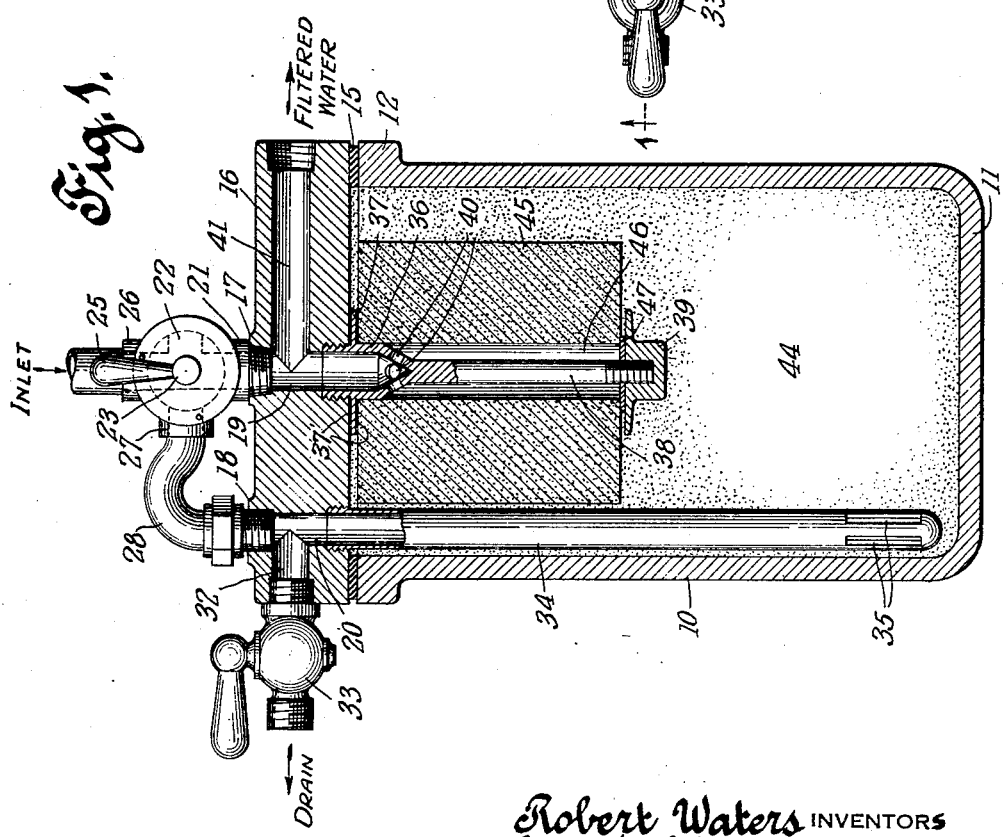
Robert Waters INVENTORS
Morris Waters
BY
Warren E. Willis
ATTORNEY Sept. 16, 1930. R. WATERS ET AL 1,775,982
FILTER
Filed Oct. 31, 1929 2 Sheets-Sheet 2
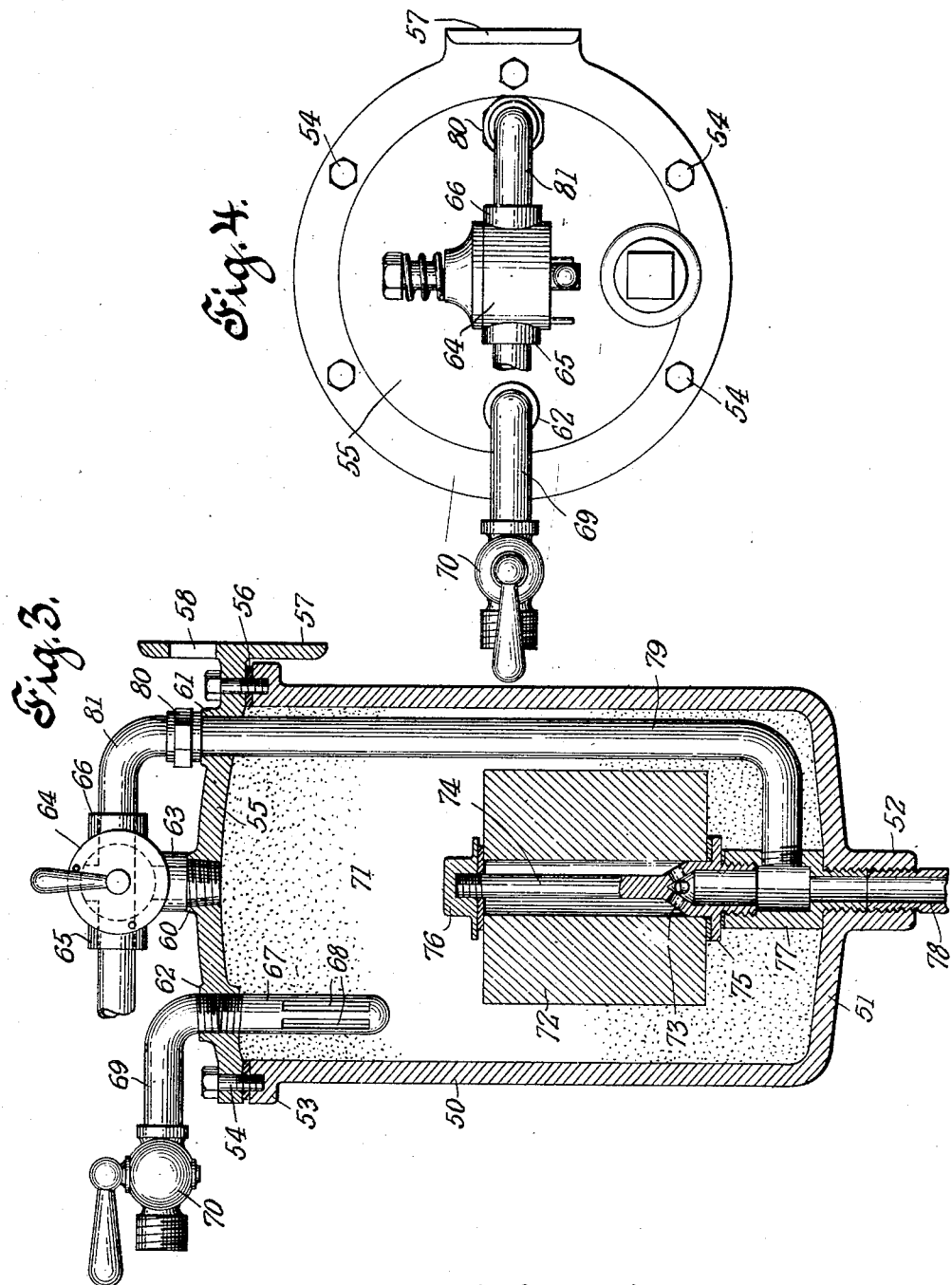
Robert Waters
Morris Waters
INVENTORS
BY
Warren E. Willis.
ATTORNEY Patented Sept. 16, 1930

1,775,982

UNITED STATES PATENT OFFICE

ROBERT WATERS AND MORRIS WATERS, OF NEW YORK, N. Y.

FILTER

Application filed October 31, 1929. Serial No. 403,713.

This invention relates to that class of apparatus, used in removing particles of solid and other foreign matter from liquids, known as filters, and more particularly to types employed in purifying and cleansing water, rendering it clear and fit for drinking and potable purposes.

While ordinary commercial filters perform such functions fairly well, most of them have disadvantageous features, such for instance as inability to deliver at will either filtered or unfiltered water thru the same outlet, which is often desirable.

Another disability occurs by lack of means for reversing the current flow, as is required in washing and cleansing the interior of the filter and filtering media used therein, a condition further aggravated by the usual difficulty entertained in obtaining access to the interior and removal of parts for cleaning or substitution.

It is therefore an object of the present invention to provide a filter or purifier of unusually simple construction, in which the several working parts are carried by its cover to be removed as a unit when required.

A further feature is in the provision of means whereby the flow of water may be directed either thru the filter or delivered outwardly without passing thru the filter at will, means also being provided to cause the current to pass thru the filter in a reverse direction, thereby to thoroughly wash the parts and filtering material therein when desired.

These and other important objects, which will further on appear, are accomplished by the novel and practical construction and combination of parts hereinafter described and shown in the accompanying drawing, constituting a material part of this disclosure, and in which:—

Figure 1 is a vertical sectional view taken on line 1—1 of Figure 2.

Figure 2 is a top plan view of a filter made in accordance with the invention.

Figure 3 is a sectional view similar to Figure 1 but showing a modification in construction.

Figure 4 is a top plan view of the same.

The filter body as shown in Figure 1 consists of a solid walled cylindrical tank 10 closed at its lower end 11 and having at its open upper end an annular flange 12 provided with openings to receive cover clamp screws 13.

The interior of the tank is preferably finished with a vitrified enamel, tin coating or otherwise treated to produce a smooth surface resistant to rust or erosion from the water.

A cover 14 is suited to engage over the flange 12 and drilled to receive the clamp screws 13, there being a gasket 15 therebetween to form a leak-tight joint. If desired a support hanger 14' may be integrally formed on the cover to carry the filter by attaching the hanger in a suitable manner to a wall; also due to the flat bottom 11, the tank may be seated on any level surface, as a floor or shelf.

Extending diametrically across the upper side of the cover is a uniformly raised ridge 16 of parallel thickness and on top of the ridge is a boss 17, another similar boss 18 being spaced towards one end, these bosses being bored to produce openings respectively 19 and 20 extending thru the cover.

The axial opening 19 is threaded to receive one of the outlets 21 of a three-way valve 22 having a stem 23 drawn to its seat by a coiled compression spring 24 and provided with a control handle 25 the position of which is indicated by a dial on the front of the valve body or, if preferred, may make contact with stop pins fixed in the face.

Directly over the valve outlet 21 is an inlet 26 to receive a pipe leading from a water supply source, and on the side of the valve body is a lateral outlet 27 to receive a goose-neck connection 28 including a union coupling having a part threaded into the opening 20.

Intersecting the opening 20, centrally of the ridge 16, is a port 32 threaded to receive a cock 33 controlling the passage and which may be connected to a drain for disposal of wash water.

Threaded into the lower end of the opening 20 is a tube 34 extending downwardly within the tank 10, its closed lower end reaching nearly to the tank bottom 11 and provided at its lower portion with a series of slots or perforations 35 by which the water normally finds its exit into the tank.

Similarly the lower end of the opening 19 is threaded to receive a hollow plug 36 having a thin hexagonal flange 37 held tightly against the under side of the cover by the plug threads, packing washers 37' being provided above and below the flange.

The walls of the tubular portion of the plug converge into a stem 38 of reduced diameter terminating in a threaded end portion suited to receive a flanged clamp nut 39, and the convergent walled portion of the plug are drilled to present perforations 40.

A port 41 constituting a by-pass, leads from the opening 19 in the ridge 16, opposite the port 32, the end of the port being internally threaded to receive a pipe for dispensing the filtered water.

The cover 14 is provided with a boss 42 internally threaded to receive a removable plug 43, the opening thru the boss being used as an inlet for the final filling of the filter bed material 44, the lower part of the tank 10, preferably having been partially filled and into which the inlet pipe 34 extends. The plug 43 also permits the entrance of a sterilizing solution in a convenient manner at any time it may be required.

Any approved granular material may be used, as bone black, crushed charcoal, sand, etc. the fragments of which have an affinity for the particles entrained in the water, and which, in mass formation, serve as a strainer.

Above the filter bed is suspended a thick walled hollow cylindrical block 45 made of porous but solid material, such as carbon, natural or artificial stone, argillaceous earths or the like, the block being of lesser diameter than that of the tank and formed with an axial passage 46, guided by the plug 36 the stem of which passes thru the passage and supports the block by means of the nut 39 and washer 47, retaining the block tightly against the under side of the cover 14.

It is to be noted that as all parts are carried by the cover, by removal of the screws 13, the tank can be removed, giving access to the operative parts in a convenient manner and without disturbing the water connections in anyway, while the filter bed material may be supplied after assembling.

In operation the three-way valve 22 is turned to admit water thru the lateral outlet 27 to the tube 34, whereupon, if the cock 33 is closed, the water will find its way thru the filter bed 44, pass thru the interstices of the block 45, into the passage 46 and out thru the plug perforations 40 into the port 41 and thence is delivered upon demand.

If unfiltered water is required the valve will be turned to direct the flow thru its lower outlet into the opening 19 and pass directly out of the port 41.

When it is desired to cleanse the filter the three-way valve is opened, as in delivering unfiltered water, it being understood that the outlet for filtered water is closed, and the cock 33 opened; thereupon the water passes through the perforations in the plug, filter block walls and bed, into the tube 34 and out of the cock 33 to the drain.

In the modified form of apparatus, shown in Figures 3 and 4, the body 50 has a concave bottom 51 provided with a central extending boss 52 and a flange 53 at its top to receive bolts 54 used in securing a cover 55 thereover, a gasket 56 being interposed.

The cover, preferably slightly convex, is provided at one edge with a right angled flange constituting a hanger 57, its flat outer face being contactable with a wall, and having an opening 58 to engage a hook or other supporting projection.

On the upper surface of the cover are raised bosses 60—61—62 respectively at the center and spaced in alinement therefrom, the central boss 60 being suited to receive one of the outlets 63 of a three-way valve 64 having an inlet 65 and an opposed outlet 66, the valve being of the type previously described and operated in like manner.

The inlet 65 is connected with the supply source of the liquid to be purified and may be entered directly into the upper portion of the tank 50 into which extends a tube 67 having a series of slots or perforations 68 in its inreaching portion while its upper end engages in an opening in the boss 62.

Also fixed in the boss 62 is a pipe 69 controlled by a cock 70, the pipe communicating with a drain. If the cock 70 be closed the incoming liquid passes thru a filter bed 71, and the walls of a porous cylindrical filter block 72, entering openings 73 is a partially hollow support plug 74 having a flange 75 and flanged nut 76 between which the block 72 is clamped.

The plug 74 is screwed into a T fitting 77 in turn threaded into the tank bottom 51 above the boss 52 and communicates with a pipe 78 leading to wherever a demand may be made for purified water.

Connecting with the lateral opening in the T 77 is a pipe 79 connected by a union 80 with a pipe 81 engaged in the three-way valve 64 opening 66, the arrangement being such that by manipulating the valve 64, either filtered or unfiltered water may be drawn thru the pipe 78, or the interior of the filter be cleansed.

As changes of construction could be made within the scope of the invention, it is intended that all matter contained in the foregoing description or shown in the accompanying drawings shall be interpreted as illustrative and not in a limiting sense.

Having thus described the invention, what is claimed as new and desired to secure by Letters Patent, is:—

1. A filter comprising a tank, a cover removably engaged thereover, a filter bed in the lower portion of said tank, a filter block carried by said cover, said block having an axial passage to receive liquid passing through its wall, means for entering filtering material through said cover, an outlet port in the cover in communication with the passage in said block, and an inlet carried by said cover extending to the bottom of said tank, said inlet having perforations adjacent its closed lower end.

2. A filter comprising a tank, a cover removably engaged thereover, a filter bed in the lower portion of said tank, a solid walled cylindrical filter block suspended from the cover, and means on said cover to extend midway into said tank for selectively controlling the flow thru said bed and block in either of two directions.

3. A filter comprising a tank, a cover removably engaged thereover, a filter bed in the lower portion of said tank, a solid walled cylindrical filter block suspended from the cover, an inlet port in said cover leading thru the said bed, a second inlet port leading to said block, and selective means for directing the flow through either of said ports, all of said elements being permanently carried by said cover and removable as a unit therewith.

4. A filter comprising a tank, a cover removably engaged thereover, a filter bed in the lower portion of said tank, a solid walled cylindrical filter block suspended from the cover, an inlet port in said cover leading thru the said bed, a second inlet port leading to said block, selective means for directing the flow through either of said ports, said means being a fixed part of said cover, an outlet port in said cover for filtered liquids, and means for delivering unfiltered liquid thru said outlet port.

5. A filter comprising a cylindrical tank, a cover removably secured thereover, spaced inlet ports in said cover, drain and filtered liquid ports in said cover, means carried by the cover to conduct liquid from one of said inlet ports to the bottom of said tank, said tank containing loose filtering media in its lower portion, a solid cylindrical filter block suspended from said cover open to the other inlet port, and a valve carried by said cover controlling both inlet ports to deliver liquid to pass thru said bed and said block selectively.

6. A filter comprising a cylindrical tank, a cover removably secured thereover, said tank containing loose filtering media, means carried by said cover to enter liquid within said tank near its bottom, ports for the inlet and outlet of liquid in said cover, and a three-way valve fixed centrally of said cover controlling all of said ports whereby filtered and unfiltered water may be delivered selectively and also the interior of said tank flushed.

7. A filter comprising a cylindrical tank having a removable cover, a three-way valve fixed in said cover controlling the inlet of liquid, said tank containing filtering media, a tube perforated at its lower end extending from said cover to the bottom of the tank, said tube being in communication with one of the openings in said valve to be controlled thereby, a cylindrical block of filtering material clamped to said cover to extend into the tank, said block having an axial chamber communicating with another opening in said valve to be controlled thereby, and an outlet port leading from the connection between said tube and valve whereby said block and media may be reached by a reverse current of liquid upon manipulation of said valve.

8. A filter comprising a cylindrical tank having a removable cover, a three-way valve fixed in said cover controlling the inlet of liquid, said tank containing filtering media, a tube perforated at its lower end extending from said cover into the tank, a filter block supported in said tank, filter material surrounding said block, means to supply filter material thru said cover, and means for conducting liquid from said valve reversely thru the filter, said means permitting the discharge of filtered and unfiltered liquid at will.

9. A filter comprising a cylindrical tank having a removable cover, a three-way valve fixed in said cover controlling the inlet of liquid, said tank containing filtering media, a tube perforated at its lower end and closed at its bottom extending from said cover into the tank, a filter block supported in said tank, filter material surrounding said block, means to supply filter material thru said cover, and a by-pass leading from said valve around said filter block and material to the point of discharge.

In testimony whereof we affix our signatures.

MORRIS WATERS.
ROBERT WATERS.